(12) United States Patent
Shin et al.

(10) Patent No.: US 10,230,473 B2
(45) Date of Patent: Mar. 12, 2019

(54) OPTICAL TRANSMITTERS INCLUDING PHOTONIC INTEGRATED CIRCUIT

(71) Applicant: Samsung Electronics Co., Ltd., Suwon-si, Gyeonggi-do (KR)

(72) Inventors: Dong-jae Shin, Seoul (KR); Kyoung-ho Ha, Seoul (KR); Seong-gu Kim, Pyeongtaek-si (KR); Jin-kwon Bok, Suwon-si (KR); Jung-ho Cha, Yongin-si (KR); Dong-hyun Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 39 days.

(21) Appl. No.: 15/427,392

(22) Filed: Feb. 8, 2017

(65) Prior Publication Data

US 2017/0366272 A1    Dec. 21, 2017

(30) Foreign Application Priority Data

Jun. 20, 2016    (KR) ........................ 10-2016-0076611

(51) Int. Cl.
*H04B 10/50*  (2013.01)
*G02B 6/42*   (2006.01)
(Continued)

(52) U.S. Cl.
CPC ......... *H04B 10/572* (2013.01); *H04B 10/032* (2013.01); *H04B 10/801* (2013.01);
(Continued)

(58) Field of Classification Search
CPC ............................ G02B 6/4286; H04B 10/506
See application file for complete search history.

(56) References Cited

U.S. PATENT DOCUMENTS 7,801,442 B2   9/2010  Wang et al.
8,781,322 B2   7/2014  Lam et al.
(Continued)

FOREIGN PATENT DOCUMENTS

JP     2000092001 A    3/2000
JP     2008028504 A    2/2008
(Continued)

*Primary Examiner* — Nathan M Cors
(74) *Attorney, Agent, or Firm* — Harness, Dickey & Pierce, P.L.C.

(57) ABSTRACT

An optical transmitter includes photonic integrated circuits configured to respectively output optical transmission signals in different wavelength ranges. A photonic integrated circuit may include emitters configured to emit beams having different wavelengths; drivers configured to respectively provide power to the emitters, and a wavelength division multiplexer configured to transmit the beams emitted by the emitters. A photonic integrated circuit may include a switch device that controls the drivers, and light detectors configured to detect intensities of the beams emitted from the emitters. The switch device may selectively operate at least one driver of the plurality of drivers based on information associated with intensities of the beams. The switch device may selectively operate a driver connected to an emitter, based on a determination that an intensity of a beam emitted by another emitter is less than a threshold intensity value.

18 Claims, 10 Drawing Sheets

(51) Int. Cl.
*H04B 10/572* (2013.01)
*H04B 10/80* (2013.01)
*H04J 14/02* (2006.01)
*H04B 10/032* (2013.01)
*G02B 6/43* (2006.01)

(52) U.S. Cl.
CPC ............ *H04J 14/02* (2013.01); *G02B 6/4286* (2013.01); *G02B 6/43* (2013.01)

(56) References Cited

U.S. PATENT DOCUMENTS

| | | | |
|---|---|---|---|
| 2011/0170856 A1 | 7/2011 | Kannari et al. | |
| 2014/0029951 A1* | 1/2014 | Handelman | H04J 14/02 398/91 |
| 2016/0285557 A1* | 9/2016 | Flens | H04B 10/40 |
| 2016/0301191 A1* | 10/2016 | Orcutt | H04B 10/5053 |

FOREIGN PATENT DOCUMENTS

| | | | |
|---|---|---|---|
| JP | 2008141674 A | 6/2008 |
| JP | 2008199098 A | 8/2008 |
| JP | 2013146039 A | 7/2013 |
| JP | 2015095690 A | 5/2015 |

\* cited by examiner

OPTICAL TRANSMITTERS INCLUDING PHOTONIC INTEGRATED CIRCUIT

CROSS-REFERENCE TO RELATED APPLICATIONS

This application claims the benefit of Korean Patent Application No. 10-2016-0076611, filed on Jun. 20, 2016, in the Korean Intellectual Property Office, the disclosure of which is incorporated herein in its entirety by reference.

BACKGROUND

The inventive concepts relates to optical transmitters, and more particularly, to optical transmitters including photonic integrated circuits.

In order to exponentially increase the amount of data transmitted in data communication transmissions, optical communication research and development have been actively conducted. Optical communication uses an optical transmitter to transmit information via optical fiber cables and is mainly used in a long-distance communication network. In addition, as the optical speed of electronic devices and the amount of data communicated rapidly increase, an optical communication system may be more commonly used in a short distance communication network, including a board to board communication network, a chip to chip communication network, some combination thereof, or the like.

In some cases, optical devices of a discrete device type are assembled on a printed circuit board (PCB). However, similar to electrical devices which had been used before integrated circuits were invented, it may be difficult to reduce costs resulting from an economy of scale according to this assembly method. Accordingly, research into implementing a photonic integrated circuit that is similar to an electric integrated circuit is conducted.

SUMMARY

The inventive concepts may provide optical transmitters including one or more photonic integrated circuits.

According to some example embodiments, an optical transmitter may include: a plurality of photonic integrated circuits configured to output separate optical transmission signals of a plurality of optical transmission signals associated with different wavelength ranges, respectively; and an output unit configured to combine the plurality of optical transmission signals that are output from the plurality of photonic integrated circuits with each other and output multiplexed optical signals. At least one first photonic integrated circuit of the plurality of photonic integrated circuits is configured to output a particular optical transmission signal of the plurality of optical transmission signals, the particular optical transmission signal being associated with a particular wavelength range of the different wavelength ranges. The at least one first photonic integrated circuit may include a plurality of first emitters configured to emit beams having different wavelengths, each wavelength of the different wavelengths being within the particular wavelength range, a plurality of first drivers configured to provide power to separate emitters of the plurality of first emitters, respectively, and a wavelength division multiplexer configured to transmit, to a port, the beams emitted by the plurality of first emitters as the particular optical transmission signal.

According to some example embodiments, an optical transmitter may include: a first photonic integrated circuit configured to output a first optical transmission signal associated with a first wavelength range; a second photonic integrated circuit configured to output a second optical transmission signal associated with a second wavelength range that is different from the first wavelength range; and a wavelength division multiplexer configured to combine the first optical transmission signal with the second optical transmission signal. The first photonic integrated circuit may include a first emitter configured to emit a first beam having a first wavelength in the first wavelength range, at least one second emitter configured to emit a second beam having a second wavelength in the first wavelength range, the at least one second emitter further configured to emit the second beam based on a determination that a beam intensity associated with of the first beam is less than a threshold intensity value, and a transmitter configured to receive a beam of the first beam or the second beam and transmit the received beam to a port.

According to some example embodiments, a photonic integrated circuit configured to output an optical transmission signal associated with a wavelength range may include: a plurality of emitters configured to emit beams having different wavelengths, each wavelength of the different wavelengths being within the wavelength range, a plurality of drivers configured to provide power to separate emitters of the plurality of emitters, respectively, and a wavelength division multiplexer configured to transmit the beams emitted by the plurality of emitters as the optical transmission signal, wherein, the plurality of emitters includes a first emitter and a second emitter, the second emitter is configured to emit light based on a lifetime of the first emitter.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1A:
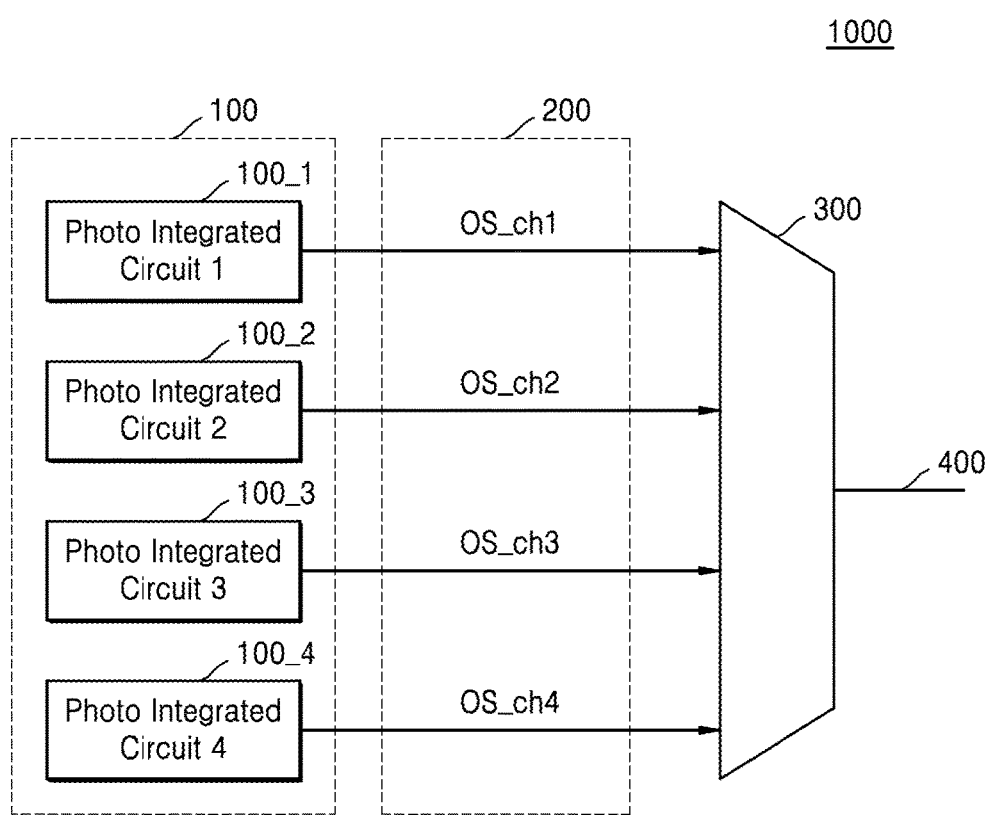
FIG. 1A is a diagram of an optical transmitter according to some example embodiments.
Figure 1B:
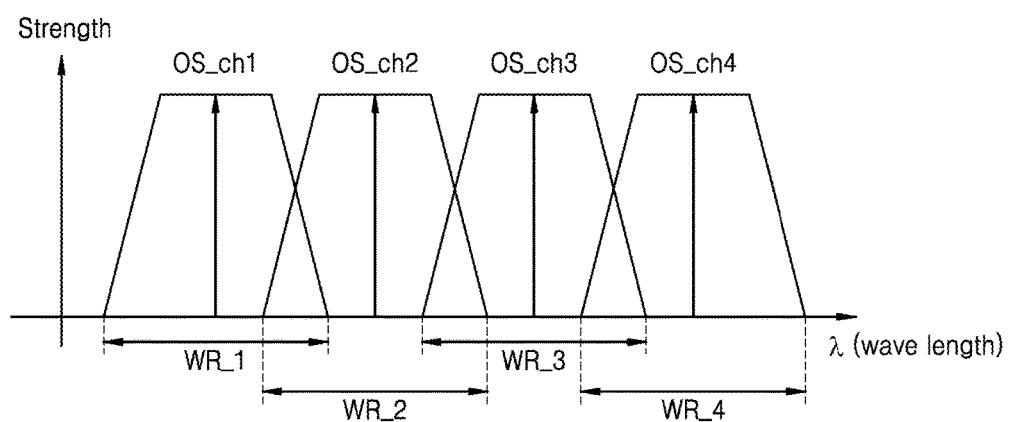
FIG. 1B shows a wavelength range of optical transmission signals that are output from photonic integrated circuits included in an optical transmitter, according to some example embodiments.

FIG. 1A is a diagram of an optical transmitter 1000 according to some example embodiments, and FIG. 1B shows a wavelength range of optical transmission signals that are output from photonic integrated circuits included in an optical transmitter, according to some example embodiments.

Referring to FIG. 1A, the optical transmitter 1000 may include photonic integrated circuits 100, a channel unit 200, an output unit 300, and an optical channel 400.

The photonic integrated circuits 100 may be first to fourth photonic integrated circuits 100_1 to 100_4, but inventive concepts are not limited thereto. The photonic integrated circuits 100 are elements in which optical and electrical devices configured to perform one or more various functions are integrated into a single substrate and miniaturized. The optical elements forming ("at least partially comprising") the photonic integrated circuits 100 may be classified into active elements and/or passive elements. An active element may be an element configured to receive and utilize a supply of electrical power and may include a light source, a modulator, a receiver, etc. A passive element may be an element configured to not receive and/or utilize a supply of electrical power and may include a waveguide, a coupler, a filter, a multiplexer, some combination thereof, or the like. The photonic integrated circuits 100 may include at least one of the first to fourth photonic integrated circuits 100a, 100b, 100c and 100d to be described below.

The first to fourth photonic integrated circuits 100_1 to 100_4 may be configured to output optical transmission signals OS_ch1 to OS_ch4 that are formed in different wavelength ranges, respectively. Each of the optical transmission signals OS_ch1 to OS_ch4 may be transmitted to the output unit 300 by the channel unit 200.

The output unit 300 may be configured to combine and pass the optical transmission signals OS_ch1 to OS_ch4 that are transmitted from the photonic integrated circuits 100 and have (e.g., are associated with) different wavelength ranges. In some example embodiments, the output unit 300 may include a wavelength division multiplexer, and the wavelength division multiplexer may use an arrayed waveguide grating. The wavelength division multiplexer may distribute the optical transmission signals OS_ch1 to OS_ch4, which are incident, to arrayed waveguides of an arrayed waveguide structure and may transmit the optical transmission signals OS_ch1 to OS_ch4 to the optical channel 400. The arrayed waveguide structure may be a waveguide structure that includes quartz glass on a substrate including silicon, etc. According to a wave division multiplexing (WDM) method, multiple channels may be simultaneously transmitted by using beams having different wavelengths.

The optical channel 400 may transmit optical signals by using integrated flat waveguides, optical waveguides, or optical fibers. The optical signals according to the WDM method may effectively use wide bandwidths with respect to which optical fibers are provided. Since signals may be transmitted according to the number of WDM in the WDM method, a larger number of signals may be transmitted than in a time division multiplexing (TDM) method.

The optical channel 400 may reduce interaction between channels by reducing walk-off length and by using optical fibers having a large variance. The optical channel 400 may reduce non-linear coefficients by using large effective core area fibers. In addition, the optical channel 400 may reduce non-linearity regarding light strength by setting the strength of light transmitted to optical fibers to a smallest range as possible.

Referring to FIGS. 1A and 1B, respective wavelength ranges WR_1 to WR_4 of the optical transmission signals OS_ch1 to OS_ch4 transmitted to the output unit 300 by each channel of the channel unit 200 may be identified. The x-axis of the graph indicates a wavelength λ, and the y-axis indicates the strength of signals. The wavelength ranges WR_1 to WR_4 of the optical transmission signals OS_ch1 to OS_ch4 may differ from each other and the photo integrated circuits 100_1 to 100_4 may be configured to output (e.g., "generate," "transmit," etc.) optical transmission signals OS_ch1 to OS_ch4 having non-overlapping wavelength ranges WR_1 to WR_4. For example, a width of a wavelength range of an optical transmission signal may be between about several nanometers and about several tens of nanometers.

Figure 2A:
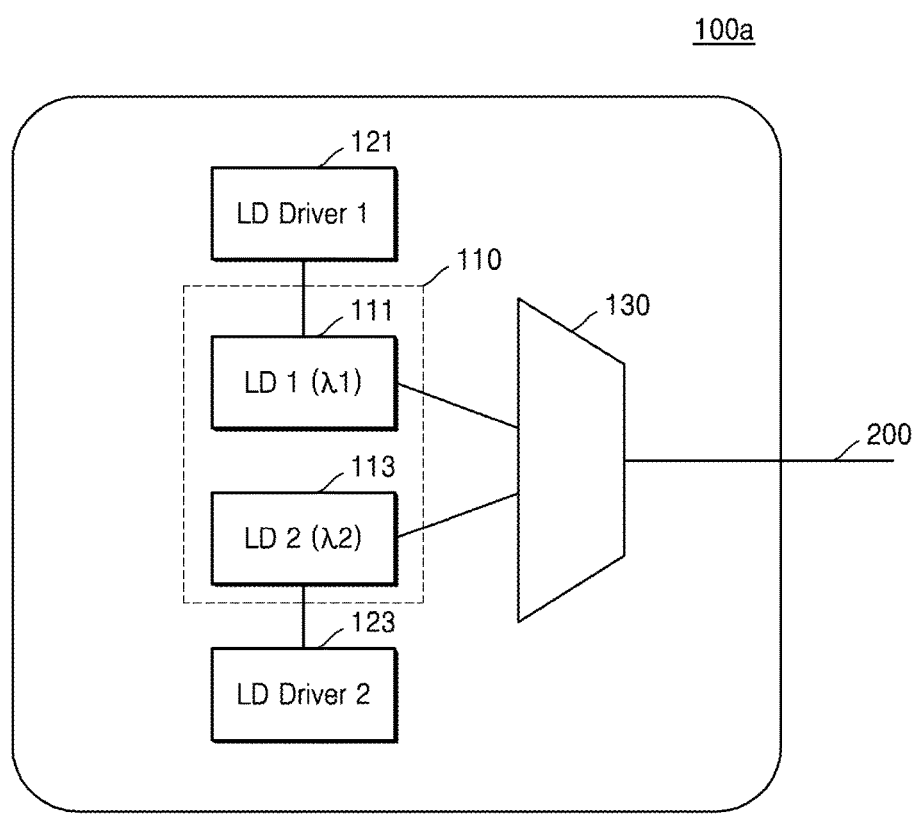
FIG. 2A is a diagram of a photonic integrated circuit included in an optical transmitter, according to some example embodiments.
Figure 2B:
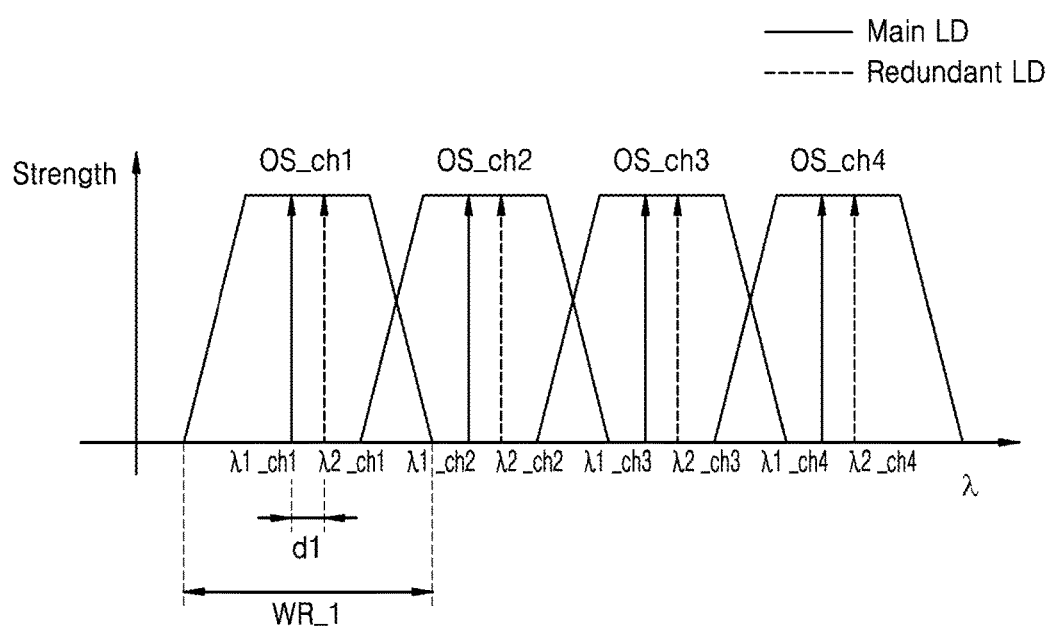
FIG. 2B shows a wavelength range of optical transmission signals that are output from photonic integrated circuits included in an optical transmitter, according to some example embodiments.

FIG. 2A is a diagram of a photonic integrated circuit 100a included in an optical transmitter, according to some example embodiments, and FIG. 2B shows a wavelength range of optical transmission signals that are output from photonic integrated circuits included in an optical transmitter, according to some example embodiments.

Referring to FIG. 2A, the photonic integrated circuit 100a included in the optical transmitter may include an optical device group 110, drivers 121 and 123, and a transmitter 130. In some example embodiments, the optical device group 110 may be embodied as (e.g., may include) a laser diode (LD). However, the inventive concepts are not limited thereto.

The optical device group 110 may include a first emitter 111 configured to emit first beams having a first wavelength λ1 and a second emitter 113 configured to emit second beams having a second wavelength λ2. An emitter may include a light source. The first wavelength λ1 and the second wavelength λ2 may have different values (e.g., the first and second beams may have different wavelengths). FIG. 2A shows only two emitters, that is, the first emitter 111 and the second emitter 113. However, the inventive concepts are not limited thereto. The optical device group 110 may further include additional emitters, and the additional emitters may generate beams having the first wavelength λ1, the second wavelength λ2, or a wavelength different from the first and second wavelengths λ1 and λ2.

In this case, the first emitter 111 may be a main emitter, and the second emitter 113 may be an auxiliary emitter. The first emitter 111 emits the first beams first, and after the lifetime of the first emitter 111 ends, the second emitter 113 may emit the second beams.

There may be multiple second emitters 113. When the lifetime of at least one second emitter 113 ends, the rest of the second emitters 113 may sequentially emit light. Therefore, since the rest of the emitters may emit light even though lifetimes of some of the emitters end, the lifetime of the photonic integrated circuit 100a may increase. In addition, the lifetime of the optical transmitter may also increase.

The optical device group 110 may include a distributed feedback laser diode that is a multi-wavelength light source or a Fabry-Perot laser diode. In some example embodiments, the optical device group 110 may include amplified spontaneous emission.

The drivers 121 and 123 may be referred to as the first driver 121 and the second driver 123, respectively. The first driver 121 may be connected to the first emitter 111 and provide power thereto. Also, the second driver 123 may be connected to the second emitter 113 and provide power thereto. If and/or when the first emitter 111 is the main emitter, the first driver 121 may operate first to provide power to the first emitter 111, and if and/or when the first driver 121 does not operate, the second driver 123 may provide power to the second emitter 113 that is the auxiliary emitter. If and/or when the photonic integrated circuit 100a included in the optical transmitter further includes emitters in addition to the first emitter 111 and the second emitter 113, the photonic integrated circuit 100a may further include drivers connected to the emitters and configured to provide power thereto.

The transmitter 130 may receive the first or second beams and transmit the received first or second beams to one port. In some example embodiments, the transmitter 130 may be embodied as a wavelength division multiplexer. When the first emitter 111 that is the main emitter is driven and emits the first beams, the transmitter 130 may transmit the first beams. When the second emitter 113 is driven because the lifetime of the first emitter 111 ends, the transmitter 130 may transmit the second beams.

Referring to FIGS. 1A, 2A, and 2B, one or more of the first to fourth photonic integrated circuits 100_1 to 100_4 may be the photonic integrated circuit 100a of FIG. 2A. The optical transmission signals OS_ch1 to OS_ch4 that are output from the first to fourth photonic integrated circuits 100_1 to 100_4 may form ("have") different wavelength ranges. The x axis of the graph indicates a wavelength λ, and the y axis indicates the strength of signals.

If and/or when the first photonic integrated circuit 100_1 includes the photonic integrated circuit 100a of FIG. 2A, wavelengths λ1_ch1 and λ2_ch1 of beams emitted from the optical device group 110 included in the first photonic integrated circuit 100_1 may be formed within a wavelength range of the first optical transmission signal OS_ch1 output from the first photonic integrated circuit 100_1. If and/or when the second to fourth photonic integrated circuits 100_2 to 100_4 includes the photonic integrated circuit 100a of FIG. 2A, wavelengths λ1_ch2, λ2_ch2, λ1_ch3, λ2_ch3, λ1_ch4 and λ2_ch4 of beams emitted from the optical device group 110 included in the second to fourth photonic integrated circuits 100_2 to 100_4 may be respectively formed within wavelength ranges of the optical transmission signals OS_ch2, OS_ch3 and OS_ch4 output from the second to fourth photonic integrated circuits 100_2 to 100_4.

Therefore, a difference dl between the wavelengths (e.g., λ1_ch1 and λ2_ch1) of the beams forming an optical transmission signal (e.g., the optical transmission signal OS_ch1) may be smaller than the wavelength range of the optical transmission signal. For example, a width of the wavelength range WR_1 of the optical transmission signal may be between about several nanometers to about several tens of nanometers, and the difference dl between the wavelengths of the beams may be within about several nanometers.

Referring to FIG. 2B, each of the wavelengths λ1_ch1, λ1_ch2, λ1_ch3, and λ1_ch4 of the first beams has a smaller wavelength value than a corresponding one of the wavelengths λ2_ch1, λ2_ch2, λ2_ch3, and λ2_ch4 of the second beams. However, the inventive concepts are not limited thereto. A user may set the values of the wavelengths λ1_ch1, λ1_ch2, λ1_ch3, λ1_ch4, λ2_ch1, λ2_ch2, λ2_ch3, and λ2_ch4.

Figure 3:
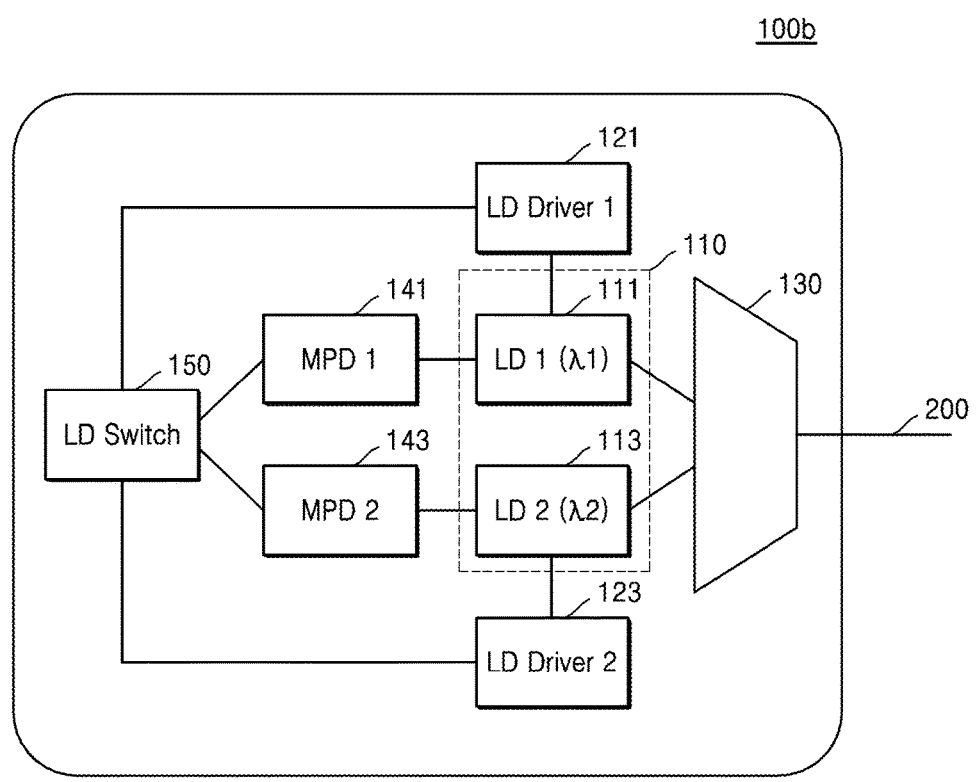
FIG. 3 is a diagram of a photonic integrated circuit included in an optical transmitter, according to some example embodiments.

FIG. 3 is a diagram of a photonic integrated circuit 100b included in an optical transmitter, according to some example embodiments. Detailed descriptions provided with reference to FIG. 2A will be omitted.

Referring to FIG. 3, the photonic integrated circuit 100b included in the optical transmitter may include the optical device group 110, the first and second drivers 121 and 123, the transmitter 130, light detectors 141 and 143, and a switch device 150. In some example embodiments, the light detectors 141 and 143 may be embodied as photo diodes (PDs). That is, the light detectors 141 and 143 may be embodied as monitoring PDs. However, the inventive concepts are not limited thereto. The photonic integrated circuit 100b according to some example embodiments further includes the light detectors 141 and 143 and the switch device 150 in comparison with the photonic integrated circuit 100a of FIG. 2, and thus, the light detectors 141 and 143 and the switch device 150 will be mainly described below.

The light detectors 141 and 143 may be referred to as the first light detector 141 and the second light detector 143 and may respectively detect strengths (also referred to as herein as "intensities") of beams emitted from the optical device group 110. That is, the first light detector 141 may be connected to the first emitter 111 and may detect the intensity of the first beam. In addition, the second light detector 143 may be connected to the second emitter 113 and may detect the intensity of the second beam. The first and second light detectors 141 and 143 may transmit information regarding the strengths of the first and second beams (e.g., information indicating the intensities of the first and second beams, information associated with the intensities first and second beams, etc.) to the switch device 150, respectively. For example, the first light detector 141 may detect an intensity of the first beam and transmit first information associated with the intensity of the first beam to the switch device 150 based on the detecting, and the second light detector 143 may detect an intensity of the second beam and transmit second information associated with the intensity of the second beam to the switch device 150 based on the detecting.

FIG. 3 shows only two light detectors, that is, the first and second light detectors 141 and 143. However, the inventive concepts are not limited thereto. The optical device group 110 may further include additional emitters, and additional light detectors configured to respectively detect the additional emitters may be included in the photonic integrated circuit 100b. In some example embodiments, at least one of the first and second light detectors 141 and 143 may be embodied as a PD.

The switch device 150 may receive the information associated with the intensities of the first and second beams which are detected by the first and second light detectors 141 and 143 (e.g., the first information and the second information) and may drive at least one of the first and second drivers 121 and 123 based on at least some of the received information. The switch device 150 may selectively drive ("operate") at least one driver of the first and second drivers 121 and 123 based on the received information. For example, the switch device 150 may selectively drive at least one driver based on information associated with an intensity of at least one beam emitted by at least one emitter. The switch device 150 may control the first emitter 111 first and then the second emitter 113 in such a manner that the first emitter 111 emits the first beam and the second emitter 113 is not driven and thus does not emit a second beam.

The switch device 150 receives first information indicating the intensity of the first beam from the first light detector 141. The switch device 150 may selectively drive one or more of the first driver 121 and the second driver 123 based on the received first information. For example, if and/or when it is determined (e.g., determined at the switch device 150) that the intensity of the first beam is less than a threshold intensity value, the switch device 150 may selectively not operate the first driver 121 and may selectively operate the second driver 123, thereby providing power to the second emitter 113. The threshold intensity value may be a minimum intensity at which the beams emitted from the optical device group 110 are converted into optical transmission signals and the optical transmission signals may transmit information via the optical channel 400 in FIG. 1A. When the intensities of the beams emitted from at least some of the emitters included in the optical device group 110 are less than the threshold intensity value, it is considered that the lifetimes of the at least some of the emitters end. The user may set the threshold intensity value.

Therefore, power may be selectively provided by the switch device 150 to one or more of the emitters included in the optical device group 110, and the emitters may emit beams accordingly. Power is not provided to the other emitters, and the other emitters may be accordingly used as spare emitters. Accordingly, although lifetimes of some emitters included in the optical device group 110 may end, the rest of the emitters may emit beams upon the elapse of the lifetimes of the other emitters, which may be determined based on the intensity of beams emitted thereby being less than the threshold intensity value. Thus, the lifetime of the photonic integrated circuit 100b, and accordingly, the lifetime of the optical transmitter may also increase.

Figure 4:
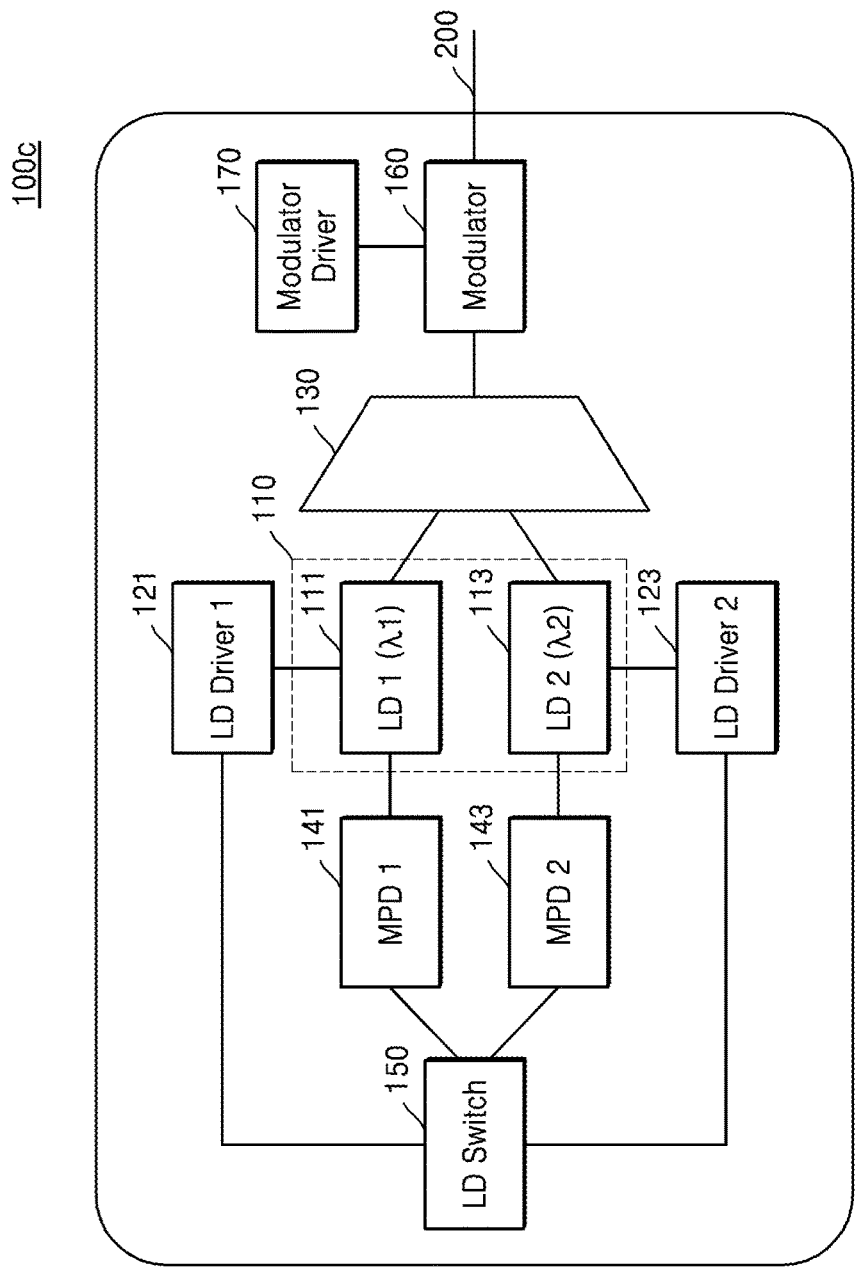
FIG. 4 is a diagram of a photonic integrated circuit included in an optical transmitter, according to some example embodiments.

FIG. 4 is a diagram of a photonic integrated circuit 100c included in an optical transmitter, according to some example embodiments. The descriptions provided with reference to FIGS. 2A and 3 will be omitted.

Referring to FIG. 4, the photonic integrated circuit 100c included in the optical transmitter may include the optical device group 110, the first and second drivers 121 and 123, the transmitter 130, the first and second light detectors 141 and 143, the switch device 150, a modulator 160, and a modulator driver 170. The modulator driver 170 may drive the modulator 160 by providing power thereto. The photonic integrated circuit 100c according to some example embodiments further includes the modulator 160 and the modulator driver 170 in comparison with the photonic integrated circuit 100b of FIG. 3. Hereinafter, some example embodiments will be described by focusing on the modulator 160 and the modulator driver 170.

The modulator 160 may change phases, amplitudes, etc. of some beams emitted from the optical device group 110 and may code the phases, the amplitudes, etc. into optical transmission signals. The modulator 160 may receive an output beam output from the transmitter 130. The output beam may be one of the first beam having the first wavelength $\lambda 1$ and emitted from the first emitter 111 and the second beam having the second wavelength $\lambda 2$ and emitted from the second emitter 113. Thus, the modulator 160 may modulate both the first wavelength $\lambda 1$ and the second wavelength $\lambda 2$.

The optical device group 110 may further include emitters in addition to the first emitter 111 and the second emitter 113 shown in FIG. 4. The emitters may emit beams having the first wavelength $\lambda 1$, the second wavelength $\lambda 2$, or wavelengths that are different from the first and second wavelengths $\lambda 1$ and $\lambda 2$. In this case, the modulator 160 may modulate the first wavelength $\lambda 1$, the second wavelength $\lambda 2$, or the wavelengths that are different from the first and second wavelengths $\lambda 1$ and $\lambda 2$.

Figure 5A:
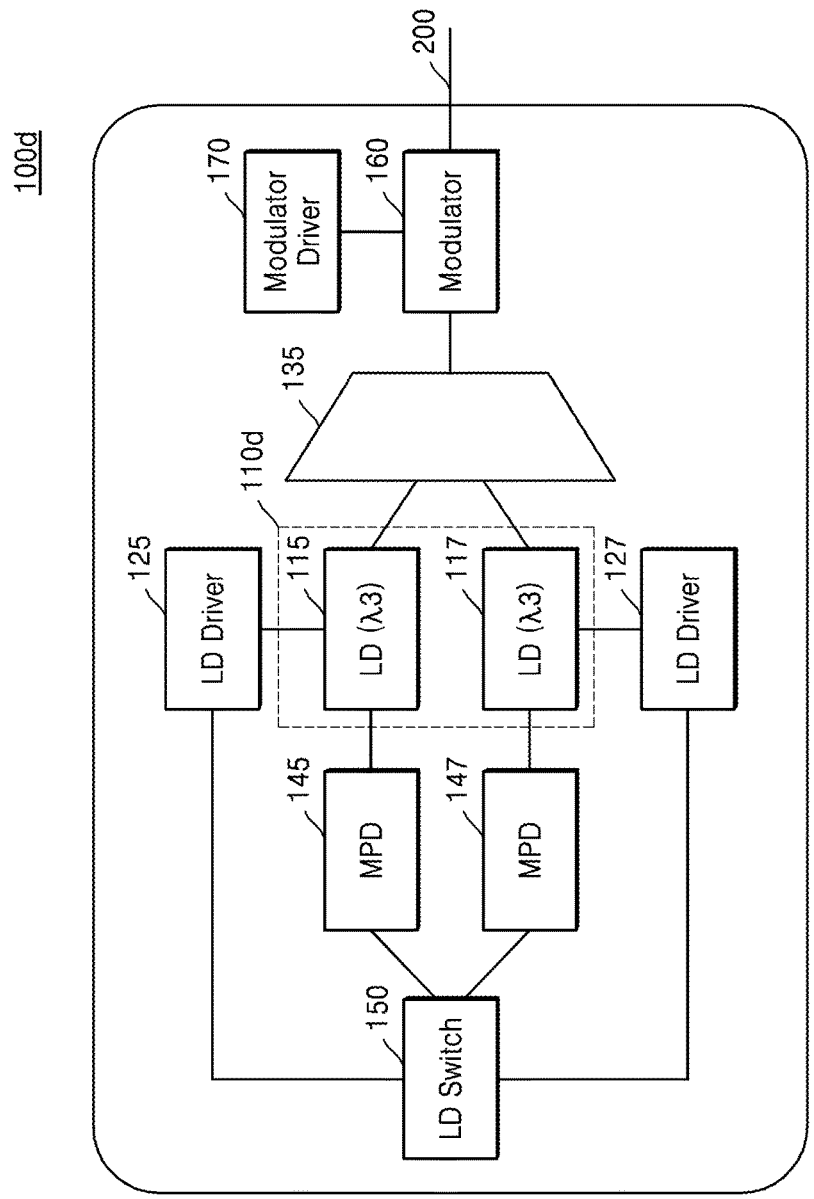
FIG. 5A is a diagram of a photonic integrated circuit included in an optical transmitter, according to some example embodiments.
Figure 5B:
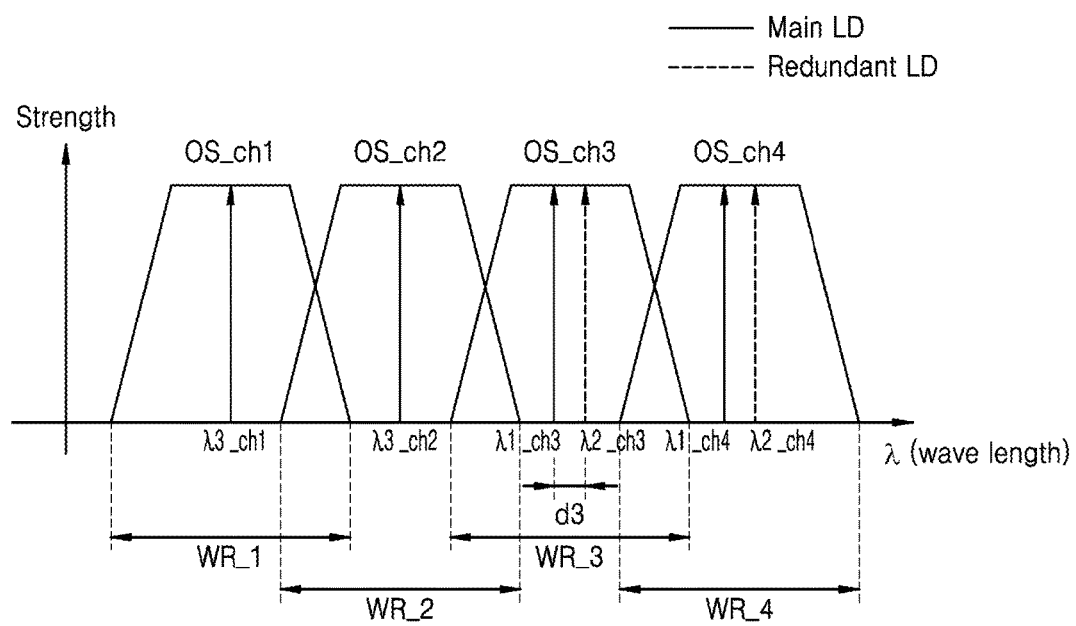
FIG. 5B shows a wavelength range of optical transmission signals that are output from photonic integrated circuits included in an optical transmitter, according to some example embodiments.

FIG. 5A is a diagram of a photonic integrated circuit 100d included in an optical transmitter, according to some example embodiments, and FIG. 5B shows a wavelength range of optical transmission signals that are output from photonic integrated circuits included in an optical transmitter, according to some example embodiments. The descriptions provided with reference to FIGS. 2A, 2B, 3, and 4 will be omitted.

Referring to FIG. 5A, the photonic integrated circuit 100d included in the optical transmitter may include an emission device group 110d, third and fourth drivers 125 and 127, a transmitter 135, third and fourth light detectors 145 and 147, the switch device 150, the modulator 160, and the modulator driver 170.

The emission device group 110d may include a third emitter 115 and a fourth emitter 117, the third emitter 115 emitting a third beam having a third wavelength $\lambda 3$ and the fourth emitter 117 emitting a fourth beam having a wavelength that is substantially the same (e.g., common) as the third wavelength $\lambda 3$ (e.g., the emitters are configured to emit beams having a common wavelength within manufacturing tolerances and/or material tolerances). FIG. 5A shows only two emitters, that is, the third and fourth emitters 115 and 117. However, the inventive concepts are not limited thereto. There may be a plurality of third emitters 115 and fourth emitters 117.

The third emitter 115 may be a main emitter, and the fourth emitter 117 may be an auxiliary emitter. The third emitter 115 that is the main emitter may emit the third beam first, and after the lifetime of the third emitter 115 ends ("elapses"), the fourth emitter 117 may emit the fourth beam. There may be multiple fourth emitters 117. Even if at least one of the fourth emitters 117 does not work, the rest of the fourth emitters 117 may sequentially emit the fourth beam.

The third driver 125 may be connected to the third emitter 115 and may provide power thereto. The fourth driver 127 may be connected to the fourth emitter 117 and may provide power thereto. When the third emitter 115 is a main emitter, the third driver 125 is driven first to provide power to the third emitter 115, and when the third driver 125 is not driven, the fourth driver 127 may provide power to the second emitter 117 that is the auxiliary emitter. When the photonic integrated circuit 100d included in the optical transmitter further includes emitters in addition to the third emitter 115 and the fourth emitter 117, the photonic integrated circuit 100d may further include drivers that are respectively connected to the emitters to provide power thereto.

The transmitter 135 may receive the third or fourth beam and may transmit the received third or fourth beam to one port. In some example embodiments, the transmitter 135 may be embodied as an optical combiner. When the third emitter 115 that is the main emitter is driven and emits the third beam, the transmitter 135 may transmit the third beam to the modulator 160. When the fourth emitter 117 that is the auxiliary emitter is driven because the lifetime of the third emitter 115 ends, the transmitter 135 may transmit the fourth beam to the modulator 160.

The third and fourth light detectors 145 and 147 may respectively detect strengths ("intensities") of beams emitted from the emission device group 110d. That is, the third light detector 145 may be connected to the third emitter 115 and may detect a strength ("intensity") of the third beam. The fourth light detector 147 may be connected to the fourth emitter 117 and may detect a strength of the fourth beam. The third and fourth light detectors 145 and 147 may transmit information associated with the intensities of strengths of the third and fourth beams (e.g., third information and fourth information) to the switch device 150. In some example embodiments, the third and fourth light detectors 145 and 147 may be embodied as PDs. That is, the third and fourth light detectors 145 and 147 may be monitoring PDs.

FIG. 5A shows only two light detectors, that is, the third and fourth light detectors 145 and 147. However, the inventive concepts are not limited thereto. The emission device group 110*d* may further include emitters, and light detectors for respectively detecting the emitters may be further included in the photonic integrated circuit 100*d*.

The switch device 150 may receive the information associated with the intensities of the third and fourth beams, which are detected by the third and fourth light detectors 145 and 147, and may selectively drive at least one of the third and fourth drivers 125 and 127 based on at least some of the received information. As referred to herein, selectively driving one or more drivers may include selectively supplying electrical power, signals, some combination thereof, or the like to the one or more drivers. The switch device 150 may control the third emitter 115 and then the fourth emitter 117 in such a manner that the third emitter 115 emits the third beam and the fourth emitter 117 is not driven.

The switch device 150 may receive information indicating the strength ("intensity") of the third beam from the third light detector 145, and if and/or when it is determined that the strength of the third beam is less than a threshold intensity value, the switch device 150 may selectively not drive the third driver 125 and instead selectively drive the fourth driver 127 so as to provide power to the fourth emitter 117. Determinations regarding the strength of beams with regard to threshold intensity values may be made at the switch device 150. The threshold intensity value may be a minimum strength at which beams emitted from the emission device group 110*d* are modulated into optical transmission signals, and the optical transmission signals may transmit information via the optical channel 400 in FIG. 1A. When strengths of beams emitted from at least some emitters included in the emission device group 110*d* are less than the threshold intensity value, it is considered that lifetimes of the at least some of the emitters end. The user may set the threshold intensity value.

Electrical power may be provided ("supplied") by the switch device 150 to some of the emitters included in the optical device group 110*d*, and the emitters may emit beams based upon receiving a supply of electrical power. In some example embodiments, power is not provided to the other emitters, and the other emitters may be used as spare emitters. Therefore, although lifetimes of some of the emitters included in the emission device group 110*d* may end, the rest of the emitters may emit beams so that the lifetime of the photonic integrated circuit 100*d* may increase and accordingly, the lifetime of the optical transmitter in which the photonic integrated circuit 100*d* is included may also increase.

The modulator 160 may receive an output beam that is output from the transmitter 135. The output beam may be one of the third and fourth beams. Thus, the modulator 160 may modulate the third wavelength $\lambda 3$. The modulator driver 170 may drive the modulator 160 by providing power thereto.

Referring to FIGS. 1A, 4, 5A, and 5B, the first photonic integrated circuit 100_1 and the second photonic integrated circuit 100_2 may be formed as the photonic integrated circuit 100*d* of FIG. 5A, and the third photonic integrated circuit 100_3 and the fourth photonic integrated circuit 100_4 may be formed as the photonic integrated circuit 100*c* of FIG. 4. However, the inventive concepts are not limited thereto. The optical transmission signals OS_ch1 to OS_ch4 that are output from the first to fourth photonic integrated circuits 100_1 to 100_4 may have different wavelength ranges. The x axis of the graph illustrated in FIG. 5B indicates a wavelength $\lambda$, and the y axis indicates strength of a signal.

Wavelengths $\lambda 3\_ch1$ and $\lambda 3\_ch2$ of respective beams emitted from the emission device group 110*d* included in the first and second photonic integrated circuits 100_1 and 100_2 may be within wavelength ranges WR_1 and WR_2 of the optical transmission signals OS_ch1 and OS_ch2 that are output from the first and second photonic integrated circuits 100_1 and 100_2, respectively. In addition, wavelengths $\lambda 1\_ch3$, $\lambda 2\_ch3$, $\lambda 1\_ch4$, and $\lambda 2\_ch4$ of respective beams emitted from the emission device group 110*d* included in the third and fourth photonic integrated circuits 100_3 and 100_4 may be within wavelength ranges WR_3 to WR_4 of the optical transmission signals OS_ch3 to OS_4 that are output from the third to fourth photonic integrated circuits 100_3 to 100_, respectively.

Therefore, a difference d3 between the wavelengths (e.g., $\lambda 1\_ch3$ and $\lambda 2\_ch3$) of the beams forming an optical transmission signal (e.g., OS_ch3) may be smaller than a wavelength range of the optical transmission signal. In some example embodiments, a width of the wavelength range of an optical transmission signal may be between about several nanometers to about several tens of nanometers, and the difference d3 between the wavelengths of the beams may be within about several nanometers.

Referring to FIG. 5B, the wavelengths $\lambda 1\_ch3$ and $\lambda 1\_ch4$ of the first beams have smaller wavelength values than corresponding ones of the wavelengths $\lambda 2\_ch3$, $\lambda 2\_ch4$ of the second beams. However, the inventive concepts are not limited thereto. The user may set the values of the wavelengths.

Figure 6:
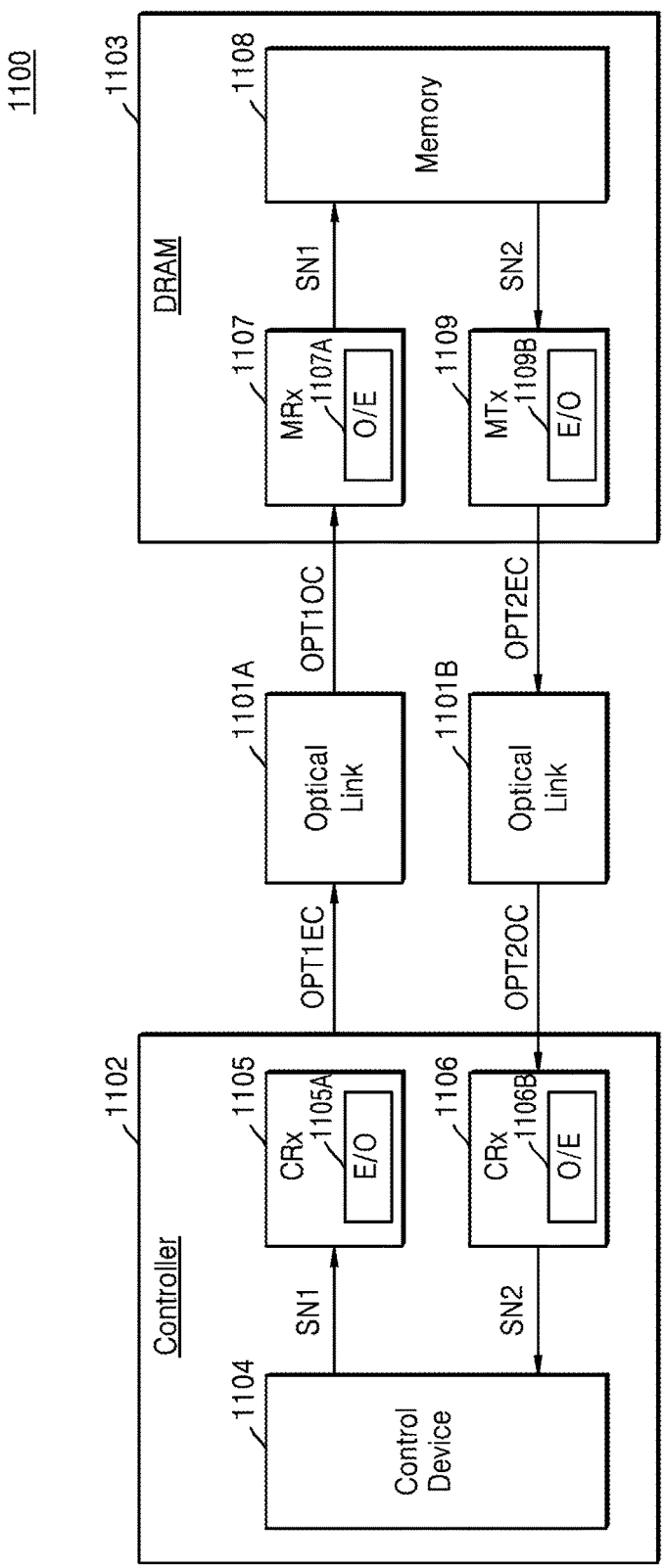
FIG. 6 is a diagram of a memory system including an optical transmitter, according to some example embodiments.

FIG. 6 is a diagram of a memory system 1100 including an optical transmitter according to some example embodiments.

Referring to FIG. 6, the memory system 1100 may include optical link devices 1101A and 1101B, a controller 1102, and a memory device 1103. The optical link devices 1101A and 1101B interconnect the controller 1102 to the memory device 1103. The controller 1102 includes a control device 1104, a first transmitter 1105, and a first receiver 1106. The control device 1104 may transmit a first electrical signal SN1 to the first transmitter 1105. The first electrical signal SN1 may include command signals, clock signals, address signals, write data, or the like, which are transmitted to the memory device 1103. In some example embodiments, one or more elements included in the memory system 1100, including the control device 1104, may include one or more processors (e.g., CPUs, processor circuitry, etc.).

The first transmitter 1105 includes a first optical transmitter 1105A, and the first optical transmitter 1105A may convert the first electrical signal SN1 into a first optical transmission signal OTP1EC and may transmit the first optical transmission signal OTP1EC to the optical link device 1101A. The first optical transmission signal OTP1EC may be transmitted to the optical link device 1101A via serial communication. The first receiver 1106 includes a first optical receiver 1106B, and the first optical receiver 1106B may convert a second optical receiving signal OPT2OC, which is received from the optical link device 1101B, into a second electrical signal SN2 and transmits the second electrical signal SN2 to the control device 1104.

The memory device 1103 includes a second receiver 1107, a memory area 1108 including a memory cell array, and a second transmitter 1109. The second receiver 1107 includes a second optical receiver 1107A, and the second optical receiver 1107A may convert a first optical receiving signal OPT1OC, received from the optical link device 1101A, into a first electrical signal SN1 and transmits the first electrical signal SN1 to the memory area 1108.

In the memory 1108, write data may be written to a memory cell therein in response to the first electrical signal SN1, or data read from the memory 1108 may be transmitted to the second transmitter 109 as a second electrical signal SN2. The second electrical signal SN2 may include a clock signal, read data, or the like, which is transmitted to the controller 1102. The second transmitter 1109 includes a second optical transmitter 1109B, and the second optical transmitter 1109B may convert the second electrical signal SN2 into a second optical transmission signal OPT2EC and may transmit the second optical transmission signal OPT2EC to the optical link device 1101B. The second optical transmission signal OPT2EC may be transmitted to the optical link device 1101B via serial communication.

The first and second optical transmitters 1105A and 1109B may each include the optical transmitter 1000 according to the embodiment of FIG. 1A. The optical transmitter 1000 according to some example embodiments includes one or more emitters. In some example embodiments, even if some of the emitters included in the optical transmitter 1000 do not work (e.g., are non-functional, broken, damaged, etc.), one or more remaining emitters of the optical transmitter 1000 may be used (e.g., may be functional, operational, etc.). Thus, lifetimes of the first and second transmitters 1105A and 1109B may be increased, and the lifetime of the memory system 1100 may also be increased, relative to optical transmitters that lack multiple emitters that may be selectively driven.

Figure 7:
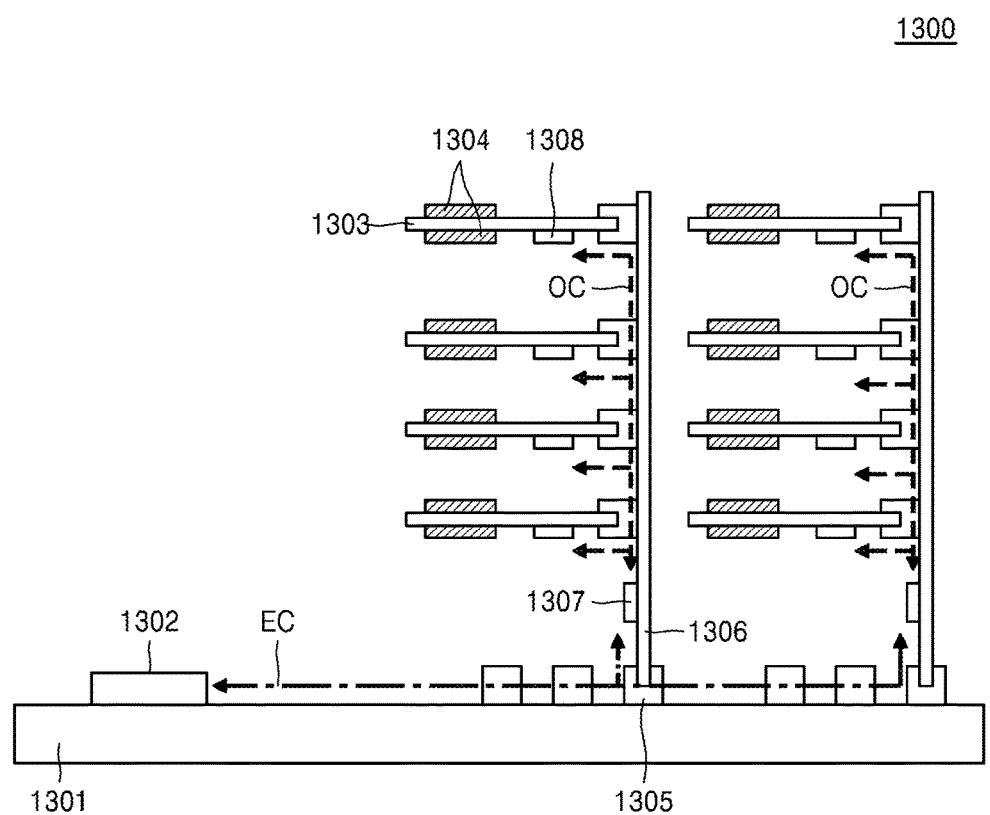
FIG. 7 is a diagram of server system including an optical transmitter, according to some example embodiments.

FIG. 7 is a diagram of a server system 1300 including an optical transmitter according to some example embodiments.

Referring to FIG. 7, the server system 1300 includes a memory controller 1302 and memory modules 1303. Each memory module 1303 may include memory chips 1304. The server system 1300 may have a structure in which sockets 1305 of a first circuit board 1301 are connected to a second circuit board 1306. The server system 1300 may have channel structures, each in which one second circuit board 1306 is connected to the first circuit board 1301 for each signal channel. However, the inventive concepts are not limited thereto, and the server system 1300 may have various structures.

Signals of the memory modules 1303 may be transmitted through optical input/output (I/O) connection. For the optical I/O connection, the server system 1300 may further include an electrophotic conversion unit 1307, and each memory module 1303 may include a photoelectric conversion unit 1308.

The memory controller 1302 is connected to the electrophotic conversion unit 1307 through an electrical channel (EC). The electrophotic conversion unit 1307 converts electrical signals, which are received from the memory controller 1302 through the EC, into optical signals and transmits the optical signals to an optical channel (OC). Also, the electrophotic conversion unit 1307 performs signal processing in which the optical signals, which are received through the OC, are converted into electrical signals and the electrical signals are transmitted to the EC.

The memory modules 1303 are connected to the electrophotic conversion unit 1307 through the OC. The optical signals transmitted to the memory modules 1303 may be converted into electrical signals by the photoelectric conversion unit 1308, and the electrical signals may be transmitted to the memory chips 1304. The server system 1300 including optical connection memory modules may have high capacity and high operation speed.

The electrophotic conversion unit 1307 may include the optical transmitter 1000 shown in FIG. 1A. The optical transmitter 1000 may include the emitters, and even if the lifetimes of some of the emitters end, the rest of the emitters may be used. Thus, the lifetime of the electrophotic conversion unit 1307 may increase, and the lifetime of the server system 1300 may also increase.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. An optical transmitter comprising:
   a plurality of photonic integrated circuits configured to output separate optical transmission signals of a plurality of optical transmission signals associated with different wavelength ranges, respectively; and
   a first wavelength division multiplexer configured to combine the plurality of optical transmission signals that are output from the plurality of photonic integrated circuits with each other and output multiplexed optical signals;
   wherein each of first photonic integrated circuits included in the plurality of photonic integrated circuits include,
   a plurality of first emitters configured to emit beams having different wavelengths, each wavelength of the different wavelengths being within the particular wavelength range,
   a plurality of first drivers configured to provide power to separate emitters of the plurality of first emitters, respectively,
   a second wavelength division multiplexer configured to transmit, to a port, the beams emitted by the plurality of first emitters as the particular optical transmission signal;
   a separate switch device configured to control the plurality of first drivers; and
   a separate plurality of light detectors configured to detect intensities of the beams emitted from the plurality of first emitters, respectively;
   wherein the separate switch device is configured to receive information associated with the intensities of the beams which are detected by the separate plurality of light detectors, and operate at least one first driver of the plurality of first drivers based on the information.

2. The optical transmitter of claim 1, further comprising:
   a plurality of channels configured to transmit, to the first wavelength division multiplexer, the plurality of optical transmission signals output from the plurality of photonic integrated circuits.

3. The optical transmitter of claim 1, wherein,
each first emitter of the plurality of first emitters includes a first main emitter and a first auxiliary emitter; and
the first auxiliary emitter is configured to emit light based on a lifetime of the first main emitter.

4. The optical transmitter of claim 1, wherein at least one second photonic integrated circuit of the plurality of photonic integrated circuits, the at least one second photonic integrated circuit configured to output a separate optical transmission signal of the plurality of optical transmission signals, includes,
a plurality of second emitters configured to emit beams having a substantially common wavelength;
a plurality of second drivers configured to provide power to separate emitters of the plurality of second emitters, respectively;
an optical combiner configured to combine the beams emitted from the plurality of second emitters with each other and transmit the combined beams to the port as the separate optical transmission signal;
a second switch device configured to control the plurality of second drivers; and
a plurality of light detectors configured to respectively detect intensities of the beams emitted from the plurality of second emitters;
wherein the second switch device is configured to,
receive information associated with the intensities of the beams detected by the plurality of light detectors, and
drive at least one driver of the plurality of the second drivers based on the information.

5. The optical transmitter of claim 4, wherein,
each second emitter of the plurality of second emitters includes a second main emitter and a second auxiliary emitter; and
the second auxiliary emitter is configured to emit light based on a lifetime of the second main emitter.

6. An optical transmitter comprising:
a first photonic integrated circuit configured to output a first optical transmission signal associated with a first wavelength range;
a second photonic integrated circuit configured to output a second optical transmission signal associated with a second wavelength range that is different from the first wavelength range; and
a first wavelength division multiplexer configured to combine the first optical transmission signal with the second optical transmission signal;
wherein the first photonic integrated circuit includes,
a first emitter configured to emit a first beam having a first wavelength in the first wavelength range,
at least one second emitter configured to emit a second beam having a second wavelength in the first wavelength range, the at least one second emitter further configured to emit the second beam based on a determination that a beam intensity associated with the first beam is less than a threshold intensity value,
a transmitter configured to receive a beam of the first beam or the second beam and transmit the received beam to a port,
a first detector connected to the first emitter and configured to detect an intensity of the first beam;
a second detector connected to the second emitter and configured to detect an intensity of the second beam; and
a switch device configured to
receive first information associated with the intensity of the first beam,
receive second information associated with the intensity of the second beam from the first detector and the second detector, respectively, and
selectively drive the first emitter or the second emitter based on at least one of the received first information and the received second information.

7. The optical transmitter of claim 6, wherein,
the first wavelength is different from the second wavelength; and
the transmitter includes a second wavelength division multiplexer.

8. The optical transmitter of claim 7, wherein the first photonic integrated circuit further includes,
a modulator configured to modulate an output beam that is transmitted through the second wavelength division multiplexer into the first optical transmission signal; and
a modulator driver configured to provide power to the modulator.

9. The optical transmitter of claim 8, wherein the modulator is configured to modulate both the first wavelength and the second wavelength.

10. The optical transmitter of claim 7, wherein the second photonic integrated circuit includes,
a third emitter configured to emit a third beam having a third wavelength in the second wavelength range;
at least one fourth emitter configured to emit a fourth beam having substantially a same wavelength as the third wavelength, the at least one fourth emitter further configured to emit the fourth beam based on a determination that a beam intensity associated with the third beam is less than a threshold intensity value; and
an optical combiner configured to receive a beam of the third beam or the fourth beam and transmit the received beam to the port.

11. The optical transmitter of claim 10, wherein the at least one second emitter and the at least one fourth emitter are a plurality of second emitters and a plurality of fourth emitters, respectively.

12. The optical transmitter of claim 6, further comprising:
a plurality of channels configured to transmit, to the first wavelength division multiplexer, the first and second optical transmission signals output from the first and second photonic integrated circuits.

13. The optical transmitter of claim 6, wherein,
the first wavelength is substantially a same wavelength as the second wavelength; and
the transmitter includes an optical combiner.

14. A photonic integrated circuit configured to output an optical transmission signal associated with a wavelength range, the photonic integrated circuit comprising:
a first emitter configured to emit first beam having a first wavelength in the wavelength range;
a second emitter configured to emit second beam having a second wavelength in the wavelength range;
a plurality of drivers configured to provide power to the first emitter and the second emitter, respectively;
a first wavelength division multiplexer configured to transmit the beams emitted by the plurality of emitters as the optical transmission signal;
a first detector connected to the first emitter and configured to detect an intensity of the first beam;
a second detector connected to the second emitter and configured to detect an intensity of the second beam; and
a switch device configured to control the plurality of drivers; and wherein the switch device is configured to,
receive first information associated with the intensity of the first beam,
receive second information associated with the intensity of the second beam from the first detector and the second detector, respectively, and
selectively drive an emitter of the first emitter and the second emitter based on at least one instance of information of the received first information and the received second information.

15. The photonic integrated circuit of claim 14, further comprising:
a channel configured to transmit, to a second wavelength division multiplexer, the optical transmission signal output from the photonic integrated circuit.

16. The photonic integrated circuit of claim 14, wherein, the photonic integrated circuit further includes,
a modulator configured to modulate an output beam that is transmitted through the first wavelength division multiplexer into the optical transmission signal; and
a modulator driver configured to provide power to the modulator.

17. The photonic integrated circuit of claim 14, wherein, each first emitter of the plurality of emitters includes a first main emitter and a first auxiliary emitter; and
the first auxiliary emitter is configured to emit light based on a lifetime of the first main emitter.

18. The photonic integrated circuit of claim 14, wherein, the switch device is configured to drive the second emitter based on a determination regarding whether an intensity of a beam emitted by the first emitter is less than a threshold intensity value.

* * * * *